Jan. 5, 1937.    C. D. HOFFMAN    2,067,124
BOTTLE HOLDER
Filed June 10, 1935    2 Sheets-Sheet 1
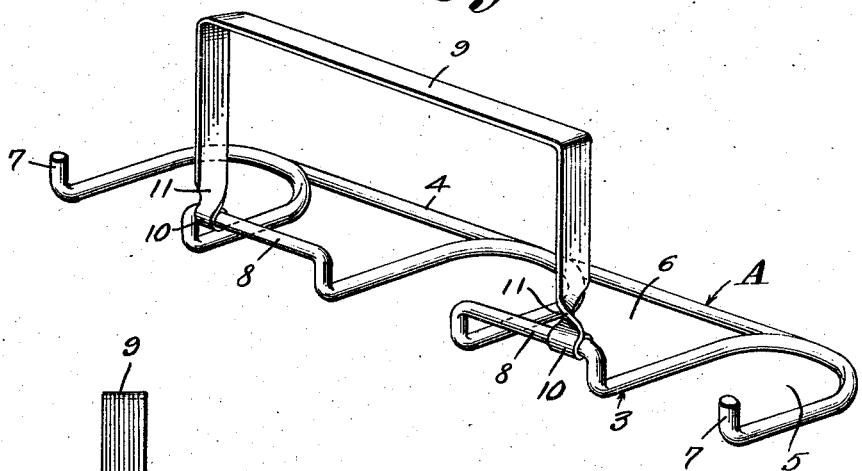
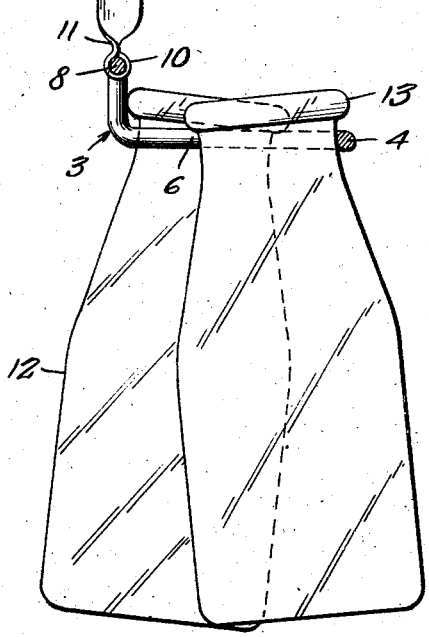
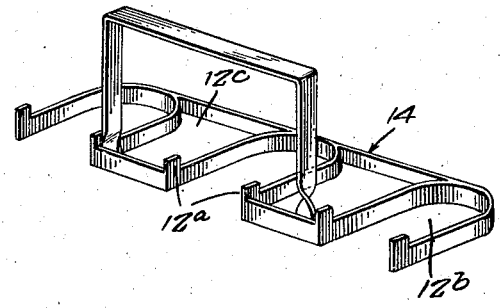
Charles D. Hoffman,
INVENTOR Jan. 5, 1937.      C. D. HOFFMAN      2,067,124
BOTTLE HOLDER
Filed June 10, 1935      2 Sheets-Sheet 2
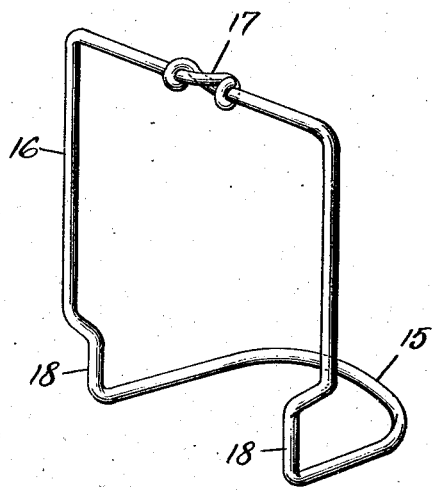
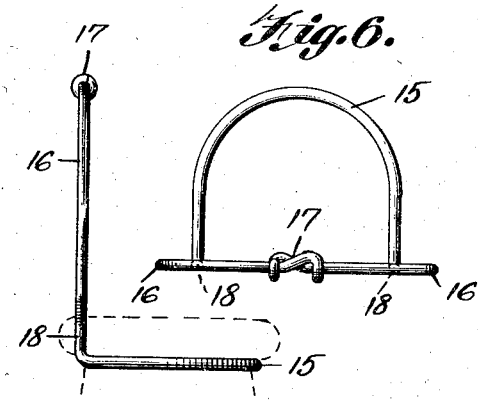
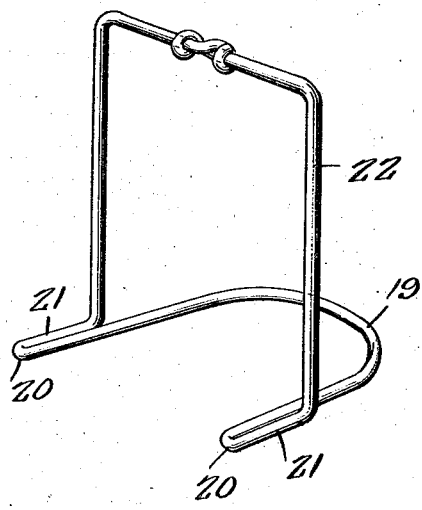
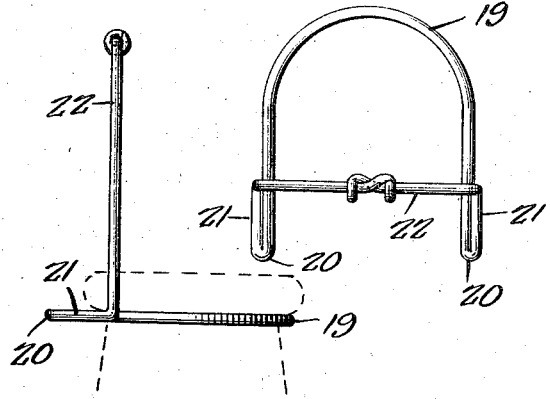
Charles D. Hoffman,
INVENTOR
BY Victor J. Evans & Co.
ATTORNEY Patented Jan. 5, 1937

2,067,124

UNITED STATES PATENT OFFICE 2,067,124

BOTTLE HOLDER

Charles D. Hoffman, Fair Oakes, Pa., assignor of twenty-four and one-half per cent to Arthur W. Pettibon and twenty-four and one-half per cent to Max H. Barnett, Rochester, Pa.

Application June 10, 1935, Serial No. 25,880

1 Claim. (Cl. 224—45)

The invention relates to a bottle holder and more especially to a hand carrier for bottles.

The primary object of the invention is the provision of a holder or carrier of this character, wherein one or more bottles, as, for example, milk bottles, can be conveniently placed therein and suspended therefrom when the holder or carrier is in the hand of a user, thus enabling the transportation of such bottle or bottles in a convenient manner.

Another object of the invention is the provision of a holder or carrier of this character, wherein a bottle or bottles can be easily and readily placed therein and when held will be prevented from accidental dropping therefrom and affords a convenient means for the carrying of the bottles by a person.

A further object of the invention is the provision of a holder or carrier of this character, which is extremely simple in its construction, thoroughly reliable and efficient in its purpose, strong, durable and inexpensive to manufacture.

With these and other objects in view, the invention consists in the features of construction, combination and arrangement of parts as will be hereinafter more fully described, illustrated in the accompanying drawings, which disclose the preferred embodiment of the invention and pointed out in the claims hereunto appended.

In the accompanying drawings:

Figure 1 is a perspective view of a holder or carrier constructed in accordance with the invention.

Figure 2 is an end elevation showing several bottles therein.

Figure 3 is a perspective view of a modification.

Figure 4 is a perspective view of another modification.

Figure 5 is a side view thereof.

Figure 6 is a top plan view.

Figure 7 is a perspective view of a further modification.

Figure 8 is a side view.

Figure 9 is a top plan view.

Similar reference characters indicate corresponding parts throughout the several views in the drawings.

Referring to the drawings in detail, particularly Figures 1 and 2, the holder or carrier comprises a frame A made from several strands of wire having the required rigidity, the strands being indicated at 3 and 4, respectively. The strand 3 is bent on itself to present the alternately arranged reversed loop-like yoke portions 5 and 6, respectively, the said portion 6 being closed by the strand 4 which is united with the strand 3 while the yokes 5 are open at that side remote from the strand 4. The strand 3 at the ends thereof is provided with the upturned tips or lugs 7 while the yokes 6 have the upturned portions 8 at the open sides of the yokes 5. Rising from the frame A is a bail or handle 9, this being made from a strip of flat metal provided with the eye terminals 10 embracing the upturned portions 8 of the yokes 6 and these eye terminals are made rigid with the said upturned portions 8 so that the frame can be carried in the hand of a person. The eye terminals 10 of the bail or handle 9 are aligned with each other by the twists 11 provided in the side arms of the said bail or handle.

Receivable in the frame A are the necks of milk bottles 12 or the like so that their external mouth beads 13 of the bottles will contact with the strands 3 and 4 of the frame A and the tips 7 and upturned portions 8, respectively, will retain the said bottles engaged in the yokes 5 and 6 to avoid accidental dropping of such bottles therefrom when being carried from place to place through hand carrying of the frame.

In Figure 3 of the drawings there is shown a modification wherein the frame 14 and its bail or handle are made from strip-like sheet metal, otherwise the make up of the holder is identical to the form shown in Figures 1 and 2 excepting that the handle is devoid of the eye terminals 10 and the strips constituting the frame have the upstanding lugs 12a next to the yokes 12b and 12c, respectively.

In Figures 4, 5 and 6 of the drawings there is shown another modification of the invention, wherein the open sided frame 15 and the bail handle 16 are formed and bent from a single length of wire, the ends 17 of this wire being united by twisting together the said ends and locating this union at the center of the bail handle 16. The bends 18 of the bail handle 16 at the merger thereof with the frame 15 constitute retaining portions for the holding of the bottle seated within the frame 15 when said bottle is engaged therein and this form of holder or carrier enables the transportation of a single bottle and the carrying thereof by hand.

In Figures 7, 8 and 9 of the drawings there is shown a still further modification of the invention, wherein the frame 19 has the links 20 turned backwardly from the open side of said frame as at 21 and thence the bail handle 22 rises vertically therefrom. This holder or carrier is designed for a single bottle.

The holder or carrier constructed for a plurality of bottles is serviceable for dairymen while the holder or carrier is serviceable for persons purchasing a bottle of milk or the like and for the carrying thereof in the hand.

By reason of the construction of the holder as shown in Figures 1, 2 and 3 of the drawings it is possible to carry empty bottles as well as filled bottles by the yokes 5 and 6 as will be apparent from Figure 2 of said drawings.

What is claimed is:

A milk bottle holder comprising a straight member, a second member formed in a plurality of open ended loops, the open ends facing away from the straight member and the closed ends attached to the straight member, and a bail-like handle attached to the second member at points between the open ends of said loops.

CHARLES D. HOFFMAN.